Dec. 9, 1930.　　　　R. R. TEETOR　　　　1,784,505
PISTON AND METHOD OF MAKING SAME
Filed Sept. 7, 1926

Inventor:
Ralph R. Teetor
By
Rector, Hibben, Davis & Macauley, Attys.

Patented Dec. 9, 1930

1,784,505

UNITED STATES PATENT OFFICE

RALPH R. TEETOR, OF HAGERSTOWN, INDIANA

PISTON AND METHOD OF MAKING SAME

Application filed September 7, 1926. Serial No. 133,737.

My invention relates generally to pistons and the manner of forming the same, and has to do particularly with a ringless type of piston used, for example, with internal combustion engines, such piston being thermally controlled to form an effective seal with the cylinder wall.

One of the objects of my invention is to form a piston of this type, which is simple in construction, cheap to manufacture, and which may be maintained in continuous service for long periods of time with a minimum of wear and with a maximum of efficiency at all times under any and all operating conditions.

Another object is to provide a piston without rings comprised of different metal, preferably steel and aluminum, the steel portion being thermally controlled to form a seal with the cylinder wall which gives a maximum of efficiency from wearing and operating standpoints.

A further object is to reduce the piston parts to a minimum, at the same time, increasing engine efficiency and whereby maintenance, labor and cost are reduced to a minimum.

Figure 1:
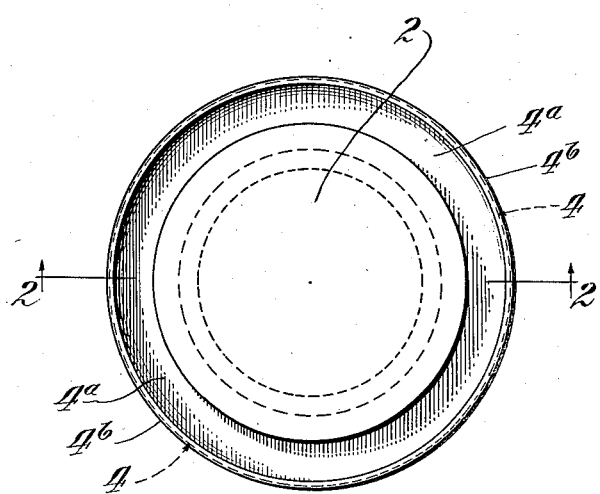

Other and further objects will become apparent as this description progresses and by reference to the drawing wherein Fig. 1 is a top plan view of a piston embodying my invention.

Figure 2:
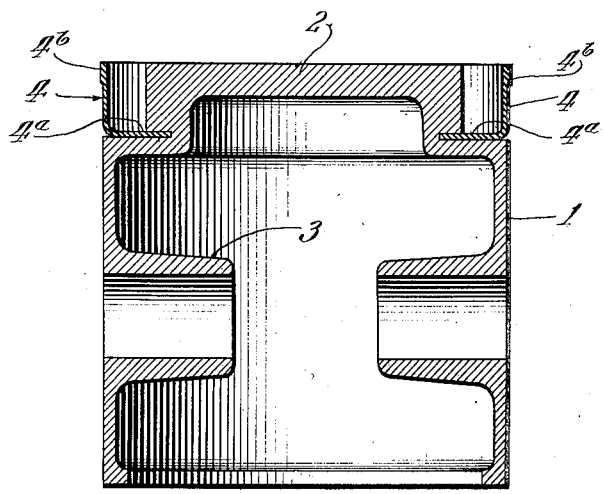

Fig. 2 is a vertical sectional view of such piston taken on line 2—2 of Fig. 1.

My novel piston, as shown by the drawings, is adapted particularly for use in connection with internal combustion engines such as those used in connection with automobiles, and it will be described as such; however, it is obvious that my piston is not limited to such use, it being capable of use in any instance where operating conditions similar to those to be described exist.

Referring particularly to the drawings, my novel piston may comprise a one-piece body 1, the top portion 2 of which is cylindrical and reduced in diameter as shown. The body 1 is provided with the ordinary inwardly extending bosses 3 which are provided for removably carrying the pin for connecting the piston to the connecting rod. The piston is adapted for operation in a cylinder (not shown) such as that used in an automobile engine which has the usual head carrying a spark plug, the cylinder and head having the ordinary water jacket for the usual circulation of water to cool such parts, as is well understood by those skilled in the art. The piston body 1 is of a diameter considerably less than the diameter of the cylinder in which it is adapted to operate, this diameter being such that, upon expansion of the same due to the heat generated during the operation of the engine it will not, under any condition, firmly engage the wall of the cylinder. This one-piece body portion 1 (including the top portion 2) is, preferably, made from cast aluminum although other suitable metal may be employed in casting the same, if desired.

It is a well known fact that considerable difficulty is experienced with pistons employing the usual piston rings from the standpoint of sealing efficiency, wear, and maintenance. I overcome such difficulties by providing a ringless piston which has self contained sealing means and which is effective to a maximum degree at all times, being directly controlled by the particular existing conditions of operations. The control, in this instance, is a thermal one aided by the form of sealing means employed.

To provide for sealing my piston in its cylinder, I employ a tubular member 4, the lower portion 4$^a$ of which is bent inwardly on a horizontal plane so as to form, in effect, a cup-shaped member with a continuous upstanding flange. This vertical flange of the sealing member 4 is substantially the same diameter as the body 1 except at the top portion thereof which is provided with circumferential bead 4$^b$. This bead is so formed that it normally has an outside diameter only slightly less (say one and one-half thousandths of an inch) than the diameter of the cylinder in which the piston operates so that, during operation, an effective and predetermined seal with the cylinder is formed and maintained as will be explained.

It is highly desirable that the sealing member 4 be formed very thin so that it be sufficiently resilient and responsive to the varying conditions of operation and so that it will respond quickly to the heat conditions in the cylinder and will rapidly dissipate the heat transmitted thereto. Thinness of the member 4 is also highly desirable to effect the desired flexibility to insure the desired positive seal. In order to provide these characteristics I, preferably, form the member 4 of a desirable high grade steel formed with a thin and flexible upstanding flange. The bottom 4ª of this member is also preferably formed thin to give throughout the desired flexibility and heat dissipating and adjusting qualities. Although I preferably employ steel for the member 4, it is obvious that any other metal which embodies the same or substantially the same characteristics may be employed.

In forming my piston with the construction and metals above mentioned, I may employ a suitable casting mold. The member 4 is first formed to the proper shape as shown, and with the bead 4ᵇ (all to the desired diameter), after which the same may be placed in the proper position in the mold. The mold is then fed with aluminum in the proper casting state and, at the end of the casting operation, a complete unitary and self-contained piston construction is formed as shown. If found desirable, the cast piston surface may be further treated to smooth and clean the same.

In operation, employing my piston, after the engine is started in operation, the upstanding flange of the sealing portion 4, due to the heat generated by the compression and combustion of the gaseous charge in the cylinder, becomes hot and expands very quickly so that the outer face of the bead 4ᵇ is pressed into a snug sealing relation against the cylinder wall. The portion 4 instantly responds to the heat generated to bring the bead into sealing engagement with the entire cylinder wall surface. The body 1 of the piston also expands, but its diameter is sufficiently less than that of the cylinder to prevent it from firmly engaging the cylinder walls.

As the bead 4ᵇ comes into contact with the cylinder wall, which is cooled by the usual water jacket (not shown) surrounding it, the heat therein is rapidly dissipated by being transmitted to the cooler cylinder with the result that the thin flange of the portion 4 is quickly reduced to substantially the temperature of the cylinder. This action is greatly facilitated by the thin steel construction of the member 4 as is well understood. The foregoing resultant reduction in temperature of the flange is effective to prevent any further expansion of such flange and, consequently, any further tightening of the bead 4ᵇ against the cylinder wall. Thus, the sealing portion of the piston is thermally and positively controlled to effect a predetermined and maximum effective seal in the cylinder and to maintain the same at all times under all operation conditions in that the bead 4ᵇ presses against the cylinder wall at all times, with just that desired and predetermined force to form the desired and maximum effective seal. Furthermore, with this construction, wear of the parts is reduced to a minimum, and the minimum number of parts also reduces the original cost and maintenance cost and labor to a minimum without impairing already established engine efficiency and, in fact, increasing such efficiency to its maximum.

While I have shown and described but one embodiment of invention, it is obvious that changes may be made therein without departing from the spirit and scope of my invention as defined by the following claims.

I claim:

1. A ringless piston comprising a body having a reduced head part and a narrow space between said head part and the adjacent body part, and a separate, continuously formed, thin steel sealing member unremovably secured to said body, said member being cup-shaped with its horizontal bottom portion extending into and fixed in said space, and its upstanding wall or flange part being substantially parallel with the wall of said body and having its upper edge portion extended radially to engage the cylinder wall, the relative proportions of the foregoing parts being such that the cylinder wall is engaged only by said radially extended portion.

2. A self-contained ringless piston construction comprising a cast aluminum body having an annular recess adjacent one end thereof extending inwardly from the circumferential surface, and a separate thin steel sealing member unremovably interlocked with said body, said sealing member having a horizontal base portion fixedly carried by said body in said recess and an upstanding thin flange with a circumferential bead adapted to provide the sole engagement with the cylinder wall during operation, said sealing member being thermally controlled to effect and maintain a predetermined sealing relation with the cylinder wall.

3. A ringless piston comprising a cast aluminum body having a groove therein, and a separate thin steel cup-shaped sealing member carried by said body, said sealing member having a continuously joined bottom portion immovable and unremovably interlocked in said groove and an upstanding unjointed flange carrying a sealing bead for effecting the sole engagement with the cylinder wall during operation of the piston therein.

4. In a piston, a cylindrical body with an integral and reduced head portion formed of one material, and a sealing member formed of another thermo-active material fixed to said body, said member having a continuously formed horizontal part fixedly embedded in said piston between said head and body, and an upstanding continuously formed part substantially parallel with said body and head and spaced from said head, said horizontal part being long enough to extend to and support said upstanding part substantially in alignment with the wall of said body part.

5. A ringless piston comprising a continuous-piece, cup-shaped member formed of steel tubing and having a horizontal portion and an unjointed thin flange for sealing the piston in the cylinder, and a body having said horizontal portion of said cup-shaped portion embedded therein during the forming of said body, said body forming the skirt and head of said piston.

6. In a piston, the combination of a cast aluminum body including an annular recess extending inwardly from the circumferential surface thereof, and a thin steel sealing member fixedly secured in said recess for engagement with the walls of a cylinder.

7. In a piston, the combination of a cast metallic body including an annular recess extending inwardly from the circumferential surface thereof, and a thin metallic sealing member fixedly secured in said recess for engagement with the wall of a cylinder.

8. In a piston, a cylindrical body having an integral, reduced head portion formed of one material and including an annular recess adjacent said head extending inwardly from the circumferential surface of said body, and a sealing member formed of another thermo-active material fixed to said body, said member having a continuously formed horizontal part fixed in said recess, and an upstanding-continuously formed part substantially parallel with said body and head and spaced from said head, said horizontal part being long enough to extend to and support said upstanding part substantially in alignment with the wall of said body part.

9. In a piston, a cylindrical body having an integral, reduced head portion formed of one material and including an annular recess adjacent said head portion extending inwardly from the circumferential surface of said body, and a cup-shaped sealing member formed of another thermo-active material fixed to said body, the bottom portion of said member being fixed in said recess and the upstanding flange thereof being substantially parallel with said body and head and spaced from said head, said bottom portion being long enough to extend to and support said upstanding flange substantially in alignment with the wall of said body part.

In testimony whereof, I have subscribed my name.

RALPH R. TEETOR.